US009638098B2

(12) United States Patent
Svihla et al.

(10) Patent No.: US 9,638,098 B2
(45) Date of Patent: May 2, 2017

(54) BYPASS MECHANISM FOR AN EXHAUST SYSTEM

(71) Applicant: Electro-Motive Diesel, Inc., LaGrange, IL (US)

(72) Inventors: Gary R. Svihla, Burr Ridge, IL (US); Nicholas Denman Norris, Chicago, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 136 days.

(21) Appl. No.: 14/623,992

(22) Filed: Feb. 17, 2015

(65) Prior Publication Data
US 2016/0237883 A1    Aug. 18, 2016

(51) Int. Cl.
| F02D 23/00 | (2006.01) |
| F01N 5/04 | (2006.01) |
| F01N 3/02 | (2006.01) |
| F02B 27/02 | (2006.01) |
| F02B 37/18 | (2006.01) |

(52) U.S. Cl.
CPC ........ F02B 37/183 (2013.01); F01N 2390/02 (2013.01); Y02T 10/144 (2013.01)

(58) Field of Classification Search
CPC ........ F02B 37/183; F02B 37/18; F01N 3/023; F01N 3/035
USPC .................................. 60/602, 280, 311, 313
See application file for complete search history.

(56) References Cited

U.S. PATENT DOCUMENTS

| 2,429,990 | A | 11/1947 | Burgess |
| 3,104,520 | A | 9/1963 | Cazier et al. |
| 4,211,081 | A | 7/1980 | Yamada |
| 5,119,633 | A | 6/1992 | Brooks et al. |
| 5,729,980 | A | 3/1998 | Mackay |
| 7,272,929 | B2 | 9/2007 | Leavesley |
| 8,037,683 | B2 * | 10/2011 | Wirbeleit ................ F01D 17/12 60/602 |
| 8,161,747 | B2 | 4/2012 | Pierpont et al. |
| 8,336,309 | B2 | 12/2012 | McEwan et al. |
| 8,499,555 | B2 | 8/2013 | Wolk et al. |
| 8,528,327 | B2 | 9/2013 | Bucknell et al. |

(Continued)

FOREIGN PATENT DOCUMENTS

| DE | 4311904 A1 * | 10/1994 | ............... F02B 37/18 |
| FI | WO 2012175794 A2 * | 12/2012 | ............ F02B 37/183 |

(Continued)

Primary Examiner — Thai Ba Trieu
(74) Attorney, Agent, or Firm — Finnegan, Henderson, Farabow, Garrett & Dunner, LLP

(57) ABSTRACT

A bypass mechanism is disclosed for use with a turbocharger. The bypass mechanism may have an exhaust passage formed by at least a first wall, and a bypass manifold formed by at least a second wall surrounding the exhaust passage and including a space between the first wall and the second wall. The bypass mechanism may further have at least one opening in the first wall fluidly connecting the exhaust passage with the space. At least one valve is configured to open and close the opening to selectively allow exhaust gas to pass from the exhaust passage to the space through the at least one opening. The space may be fluidly connected to at least one entry passage of an exhaust stack. In addition, the at least one opening and the at least one entry passage may be positioned on opposite sides of the exhaust passage.

20 Claims, 4 Drawing Sheets

(56) References Cited

U.S. PATENT DOCUMENTS

| | | | |
|---|---|---|---|
| 8,695,338 B2* | 4/2014 | Sato | F02B 37/183 60/602 |
| 2002/0078934 A1* | 6/2002 | Hohkita | F02B 37/18 60/602 |
| 2016/0010540 A1* | 1/2016 | Norris | F02B 37/183 60/602 |

FOREIGN PATENT DOCUMENTS

| | | | | |
|---|---|---|---|---|
| FI | WO 2013121111 A1 * | 8/2013 | | F02B 37/183 |
| FR | EP 0266256 A1 * | 5/1988 | | F02B 37/186 |
| JP | 02259224 A * | 10/1990 | | |
| JP | 10246109 A * | 9/1998 | | |

* cited by examiner

BYPASS MECHANISM FOR AN EXHAUST SYSTEM

TECHNICAL FIELD

The present disclosure relates generally to a bypass mechanism and, more particularly, to a bypass mechanism for an exhaust system.

BACKGROUND

Turbocharged engines often employ bypass mechanisms, also known as wastegates, to regulate a turbocharger speed and a resulting boost pressure of air delivered to an intake of the engine. A bypass mechanism typically employs at least one valve to seal exhaust gas within the primary exhaust manifold until the valve is opened to allow a portion of the exhaust to bypass the turbo machinery. The valve position can be varied to control the amount of energy released from the primary exhaust stream.

Valves of sufficient size to allow passage of the required mass flow of exhaust energy typically consume a rather large volume of space between the exhaust manifold and the turbocharger package, as does the ducting required to release the energy to an exhaust manifold downstream of the turbocharger. Further, if the bypass mechanism exhausts to an emissions aftertreatment component with multiple intakes, distributing the flow evenly between the intakes can present a challenge. Further, some valve configurations tend to create flow distortion, especially at small openings that prevents uniform distribution of the exhaust gas even far downstream from the valve.

One example of a turbocharger bypass mechanism is described in U.S. Pat. No. 3,104,520, which issued to Cazier et al. on Sep. 24, 1963 ("the '520 patent"). The '520 reference discloses a turbocharger system that includes a spring-biased valve that may be opened and closed to selectively cause exhaust gas to bypass a turbine of the turbocharger. In particular, the valve is configured to open a bypass passage that delivers the exhaust gas to an exhaust pipe. The bypass passage is a narrow, elongated passageway.

The bypass mechanism of the '520 patent suffers from several drawbacks. In particular, the use of a single valve for controlling the flow of exhaust into the bypass passage limits the amount of control over the amount and flow rate of the exhaust. Further, the narrow, elongated passageway may experience rapid changes in temperature that may lead to degradation and/or damage to certain portions of the passageway. In addition, the bypass mechanism of the '520 patent takes up a large amount of space in order to reroute the bypassed exhaust gas to the exhaust pipe.

The present disclosure is directed at overcoming one or more of the shortcomings set forth above and/or other problems of the prior art.

SUMMARY

In one aspect, the present disclosure is directed to a bypass mechanism for use with a turbocharger. The bypass mechanism may include an exhaust passage formed by at least a first wall, and a bypass manifold formed by at least a second wall surrounding the exhaust passage and including a space between the first wall and the second wall. The bypass mechanism may further include at least one opening in the first wall fluidly connecting the exhaust passage with the space. At least one valve is configured to open and close the opening to selectively allow exhaust gas to pass from the exhaust passage to the space through the at least one opening. The space may be fluidly connected to at least one entry passage of an exhaust stack. In addition, the at least one opening and the at least one entry passage may be positioned on opposite sides of the exhaust passage.

In another aspect, the present disclosure is directed to another bypass mechanism for use with a turbocharger. The bypass mechanism may include an exhaust passage formed by at least a first wall, and a bypass manifold formed by at least a second wall surrounding the exhaust passage and including a space between the first wall and the second wall. The bypass mechanism may further include at least two openings in the first wall fluidly connecting the exhaust passage with the space, at least one first valve configured to open and close to selectively allow exhaust gas to pass from the exhaust passage to the space through at least one first opening of the at least two openings, and at least one second valve configured to open and close to selectively allow exhaust gas to pass from the exhaust passage to the space through at least one second opening of the at least two openings. The at least one first valve and the at least one second valve may be different types of valves.

In another aspect, the present disclosure is directed to an exhaust system for an engine. The exhaust system may include an exhaust passage configured to receive exhaust from the engine, an exhaust stack configured to direct exhaust to the atmosphere, and a turbocharger fluidly connected between the exhaust passage and the exhaust stack. The exhaust system may further include an aftertreatment component including at least one conditioning member and a bypass mechanism configured to selectively direct exhaust gas from the exhaust passage to bypass the turbine and flow into the aftertreatment component. The bypass mechanism may include a bypass manifold surrounding the exhaust passage, at least two openings in the exhaust passage fluidly connecting the exhaust passage with the bypass manifold, and at least two valves each configured to open and close a respective one of the at least two openings to selectively allow exhaust gas to pass from the exhaust passage to the bypass manifold through the respective opening. The bypass manifold may be fluidly connected to at least one entry passage fluidly connected to the at least one conditioning member. The at least two openings and the at least one entry passage may be positioned on opposite sides of the exhaust passage. The bypass manifold may include a first pathway for the exhaust gas to pass around an outside of the exhaust passage on a first side of the exhaust passage and a second pathway for the exhaust gas to pass around the outside of the exhaust passage on a second side of the exhaust passage.

DETAILED DESCRIPTION

Figure 1:
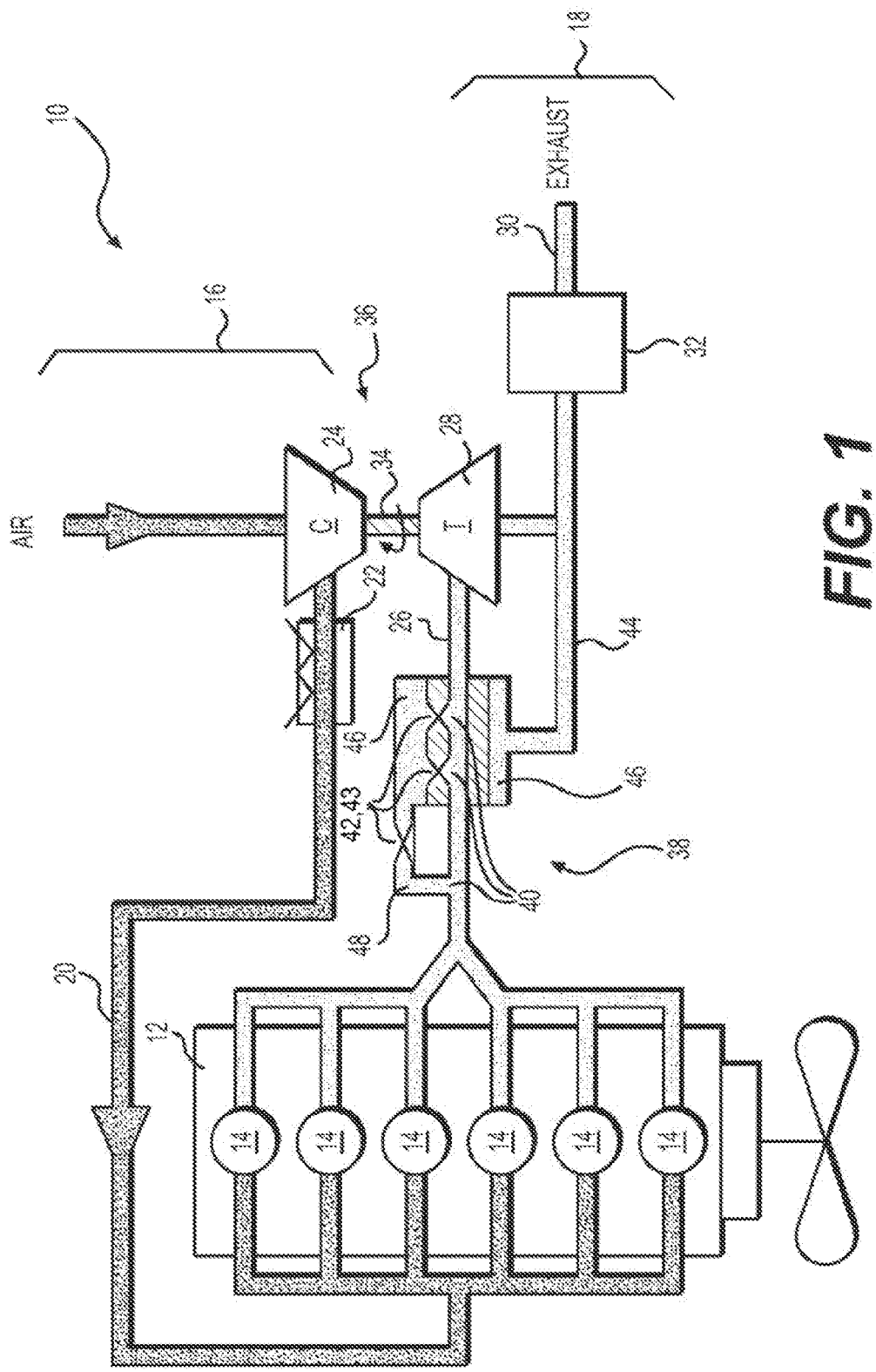
FIG. 1 is a diagrammatic illustration of an engine having an exemplary disclosed exhaust system.

FIG. 1 illustrates an exemplary engine 10. For the purposes of this disclosure, engine 10 is depicted and described as a diesel-fueled, internal combustion engine. However, it is contemplated that engine 10 may embody any other type of combustion engine such as, for example, a gasoline-fueled engine or a gaseous fuel-powered engine burning compressed or liquefied natural gas, propane, or methane. Engine 10 may include an engine block 12 at least partially defining a plurality of cylinders 14, and a plurality of piston assemblies (not shown) disposed within cylinders 14 to form a plurality of combustion chambers (not shown). It is contemplated that engine 10 may include any number of combustion chambers and that the combustion chambers may be disposed in an in-line configuration (shown), in a "V" configuration, in an opposing-piston configuration, or in any other conventional configuration.

Multiple separate sub-systems may be associated within engine 10 and cooperate to facilitate the production of power. For example, engine 10 may include an air induction system 16 and an exhaust system 18. Air induction system 16 may be configured to direct air or an air and fuel mixture into engine 10 for subsequent combustion. Exhaust system 18 may exhaust byproducts of combustion to the atmosphere.

Air induction system 16 may include multiple components configured to condition and introduce compressed air into cylinders 14. For example, air induction system 16 may include an air cooler 22 located downstream of one or more compressors 24. Compressor(s) 24 may be connected to cooler 22 (e.g., via a passage 20), and configured to pressurize inlet air directed through cooler 22 and into cylinders 14 of engine 10. It is contemplated that air induction system 16 may include different or additional components than described above such as, for example, a throttle valve, variable valve actuators associated with each cylinder 14, filtering components, compressor bypass components, and other known components that may be selectively controlled to affect an air-to-fuel ratio of engine 10, if desired. It is further contemplated that cooler 22 may be omitted, if desired.

Exhaust system 18 may include multiple components that condition and direct exhaust from cylinders 14 to the atmosphere. For example, exhaust system 18 may include an exhaust passage 26 (e.g., an exhaust manifold), one or more turbines 28 driven by exhaust flowing through exhaust passage 26, and an exhaust stack 30 connected to an outlet of turbine(s) 28. Exhaust system 18 may further include an aftertreatment component 32. Aftertreatment component 32 may be a component or system of components configured to condition exhaust gas before it is released into the atmosphere. It is contemplated that exhaust system 18 may include different or additional components than described above such as, for example, an exhaust compression or restriction brake, an attenuation device, and other known components, if desired.

Turbine(s) 28 may be located to receive exhaust leaving engine 10, and may be connected to one or more compressors 24 of air induction system 16 by way of a common shaft 34 to form a turbocharger 36. As the hot exhaust gases exiting engine 10 move through turbine(s) 28 and expand against vanes (not shown) thereof, turbine(s) 28 may rotate and drive the connected compressor(s) 24 to pressurize inlet air.

In some applications, the amount of exhaust being discharged from cylinders 14 of engine 10 may be more than a desired amount that should pass through turbine(s) 28. That is, in these situations, if all of the exhaust were to be directed through turbine(s) 28, the exhaust could cause overspeeding of turbocharger 36, excessive boost pressures, surging, and/or other related problems. For this reason, exhaust system 18 may also include a bypass mechanism 38. In one embodiment, bypass mechanism 38 may be fluidly connected between exhaust passage 26 and exhaust stack 30 (e.g., in parallel with turbine(s) 28). In another embodiment, bypass mechanism may be fluidly connected between exhaust passage 26 and another exhaust stack, separate from exhaust stack 30. Similarly, exhaust from an outlet of turbine 28 and exhaust from bypass mechanism 38 may share the same aftertreatment component 32, or may utilize separate aftertreatment components (e.g., aftertreatment component 32 and another aftertreatment component for treating exhaust gas that passes through bypass mechanism 38).

Bypass mechanism 38 may form a portion of a bypass loop that selectively allows a controlled amount of exhaust to bypass turbine(s) 28 and flow directly from exhaust passage 26 to stack 30 (or other exhaust stack). The amount of exhaust that bypasses turbine(s) 28 may be controlled (e.g., by an electronic controller or other controlling device) based on a turbocharger speed, an inlet manifold boost pressure (i.e., a pressure of passage 20), a temperature (e.g., an exhaust or inlet air temperature), a fuel control value of engine 10, or based on any other parameter known in the art.

As shown in FIG. 1, bypass mechanism 38 may include components that allow exhaust gas to exit exhaust passage 26 before reaching turbine(s) 28. For example, bypass mechanism may include one or more openings 40 and one or more valves 42 configured to selectively meter an amount of exhaust gas out of exhaust passage 26 and into a bypass passage 44. In one embodiment, bypass mechanism 38 may include a plurality of openings 40 and a plurality of valves 43 such that the amount of exhaust that is allowed to flow out of exhaust passage 26 and the rate at which the exhaust flows out of exhaust passage 26 may be precisely controlled.

In an exemplary embodiment, bypass mechanism 38 may include a bypass manifold 46 that surrounds at least a portion of exhaust passage 26. For example, bypass manifold 46 may include at least one wall that surrounds at least one wall that forms exhaust passage 26, as will be described in more detail below. Bypass mechanism 38 may further include a passage 48 fluidly connecting an upstream portion of exhaust passage 26 with bypass manifold 46. In an exemplary embodiment, passage 48 may extend parallel to exhaust passage 26. An opening 40 and valve 42 may selectively allow exhaust gas to enter bypass manifold 46 through passage 48. Additional openings 40 and valves 42 (downstream from the opening 40 associated with passage 48) may selectively allow exhaust gas to additionally or alternatively enter bypass manifold 46 directly from exhaust passage 26.

Figure 2:
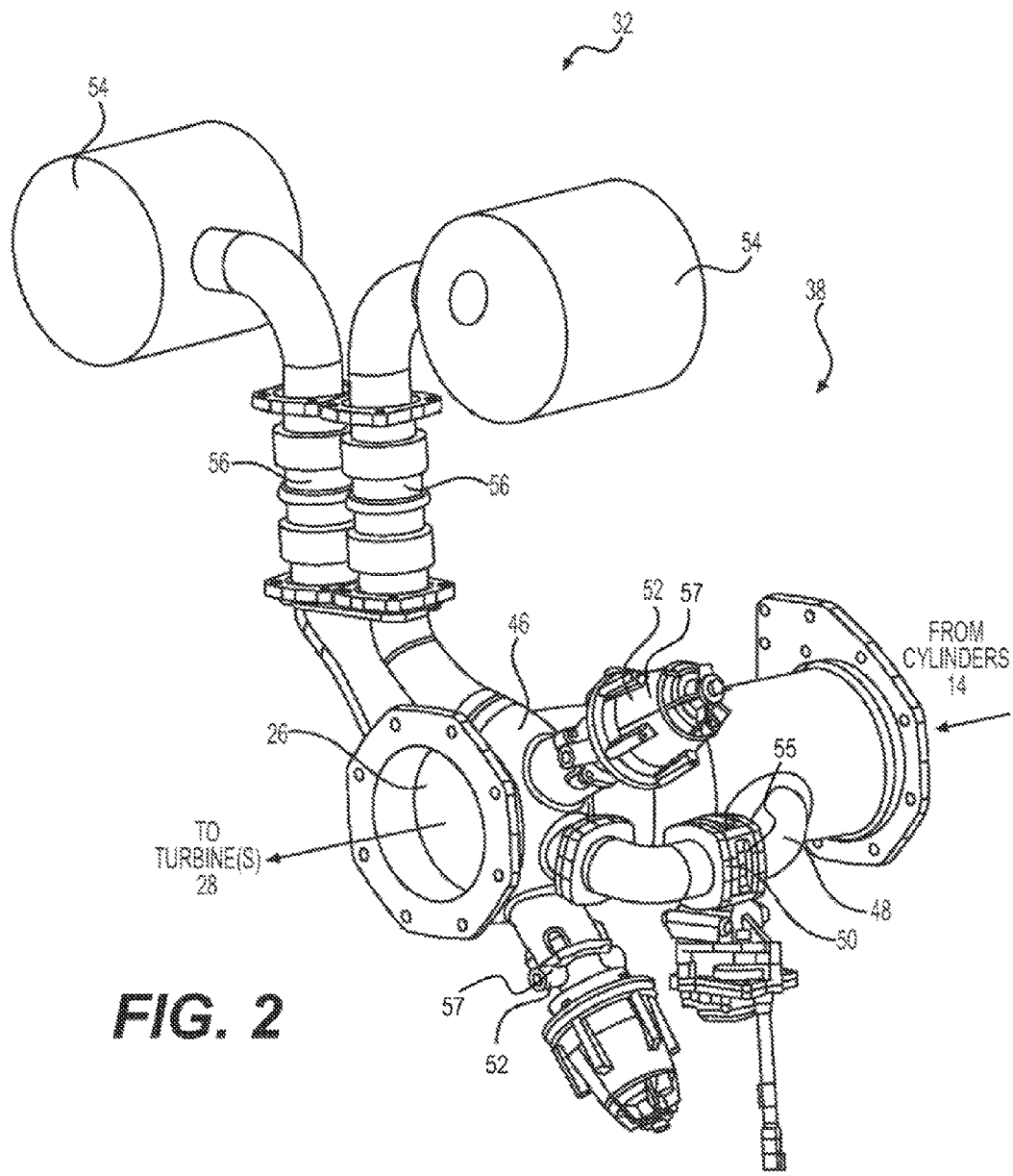
FIG. 2 is an isometric illustration of an exemplary disclosed bypass mechanism that may be used with the exhaust system of FIG. 1.
Figure 3:
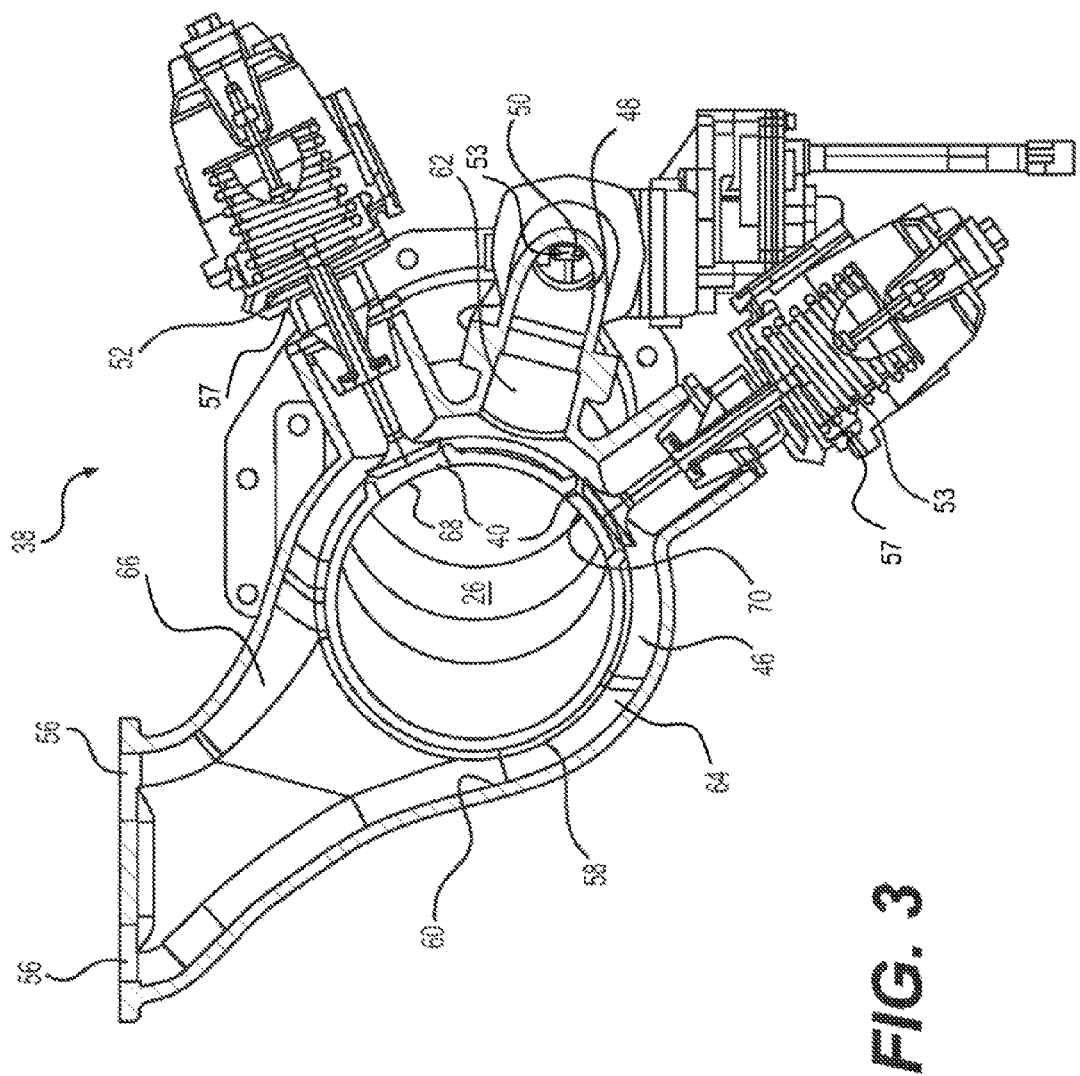
FIG. 3 a cross-sectional illustration of the bypass mechanism of FIG. 2.

FIGS. 2-3 further depict exhaust passage 26 and bypass mechanism 38. Exhaust passage 26 may include a cylindrical passageway that allows exhaust gas to flow from cylinders 14 to turbine(s) 28. While FIG. 2 depicts gas flowing in one direction from cylinders 14 to turbine(s) 28, it should be understood that, in some embodiments, the flow direction may be reversed and/or may flow to or from other components of engine 10 besides those depicted. During use some exhaust gas may be directed to bypass manifold 46 through openings 40 (see FIGS. 1 and 3). Valves 42 may be configured to open and close to allow a selected amount of exhaust gas to flow into bypass manifold 46 at a selected flow rate. In an exemplary embodiment, valves 42 may include at least one first valve 50 and at least one second valve 52.

A first valve 50 may be positioned in passage 48 and configured to meter flow of exhaust gas from an upstream portion of exhaust passage 26 to bypass a portion of exhaust passage 26 and the turbine(s) 28 through passage 48, bypass manifold 46, and bypass passage 44. In an exemplary embodiment, first valve 50 may be a butterfly valve 55, although other valve types are possible. Second valves 52 may be configured to seal an inner wall of exhaust passage 26 and selectively open to allow gas to flow directly from exhaust passage 26 into bypass manifold 46. In an exemplary embodiment, second valves 52 may be poppet valves 57, although other valve types are possible.

Exhaust gas that enters bypass manifold 46 may be directed to aftertreatment component 32. In an exemplary embodiment, aftertreatment component 32 may include two separate conditioning members 54, although other configurations are possible (e.g., one conditioning member, three or more conditioning members, etc.). Each conditioning member 54 may be configured to treat exhaust gas before it is released to the atmosphere. Each conditioning member 54 may include a separate entry passage 56 that fluidly connects the conditioning member 54 to bypass manifold 46. It should be understood that entry passages 56 may be additionally or alternatively fluidly connected to exhaust stack 30. For example, in some embodiments, conditioning members 54 may be connected between entry passages 56 and exhaust stack 30. In other embodiments, entry passages 56 may lead directly to exhaust stack 30 (e.g., in embodiments that do not include aftertreatment component 32). While two entry passages 56 are depicted and described, it should be understood that disclosed embodiments may include one or more entry passages 56. Further, it should be understood that entry passages 56 may include one or more passages, openings, connections, etc., that are located downstream from bypass manifold 46 and that lead to another component and/or an exhaust exit (e.g., via exhaust stack 30).

As shown in FIG. 3, bypass manifold 46 may include a generally ring-shaped space formed between an outer wall 58 of exhaust passage 26 and an inner wall 60 of bypass manifold 46. In other words, exhaust passage 26 may fit within bypass manifold 46 to form the space for exhaust gas to enter directly through a radial opening in exhaust passage 26. Exhaust gas that enters the space may be directed by pressure to enter entry passages 56 and into conditioning members 54 (not shown in FIG. 3) for aftertreatment or directly into exhaust stack 30 (if conditioning members 54 are omitted).

Exhaust gas may enter the space defined by bypass manifold 46 from passage 48 after passing first valve 50 and through a manifold entrance 62. In an exemplary embodiment, bypass mechanism 38 may be configured and arranged such that manifold entrance 62 and entry passages 56 are generally positioned on opposite sides of exhaust passage 26. In this way, exhaust gas may travel around the outside of exhaust passage 26 and into one or more of entry passages 56. For example, some exhaust gas may travel through a first pathway 64 by following along a lower side wall of bypass manifold 46 before entering a first of entry passages 56. Similarly, some exhaust gas may travel through a second pathway 66 by following along an upper side wall of bypass manifold 46 before entering a second of entry passages 56.

In addition or alternatively to the exhaust gas that enters bypass manifold 46 through passage 48, exhaust gas may enter bypass manifold 46 through one or more openings 68, 70 formed between and directly fluidly connecting exhaust passage 26 and bypass manifold 46. For example, when it is desired to move a small amount of exhaust gas into bypass manifold 46, it may be sufficient to only transfer exhaust gas into bypass manifold 46 through passage 48. However, when it is desired to move a larger amount of exhaust gas into bypass manifold 46, valves 52 may be opened to allow exhaust gas to quickly move into bypass manifold 46.

As shown in FIG. 3, second valves 52 may be poppet valves 57 that include a plunger or similar component that seals a respective opening 68, 70. A controller (or similar mechanism) may control second valves 52 to move the plunger between a closed position and a selected open position (e.g., an open position with a selected distance between the opening 68, 70 and the raised plunger). In this way, an amount of exhaust gas that moves through openings 68, 70 (and the rate at which it moves) may be precisely controlled through control of valves 52.

In addition, one of second valves 52 and opening 68, and another one of valves 52 and opening 70 may be generally positioned on opposite sides of manifold entrance 62. Further, opening 68 and one of entry passages 56, and opening 70 and another of entry passages 56 may be generally positioned on opposite sides of exhaust passage 26. In this way, the manifold entrance 62 and openings 68, 70 may create a symmetrical configuration that promotes an evenly divided flow of gas between entry passages 56. That is, bypass mechanism 38 may be configured such that valves 50 and 52 may be controlled to approximately evenly divide gas flow between a flow through the first pathway 64 along a lower side wall and a flow through the second pathway 66 along an upper side wall of bypass manifold 46. In this way, approximately equal amounts of exhaust gas may be directed to each of conditioning members 54.

Figure 4:
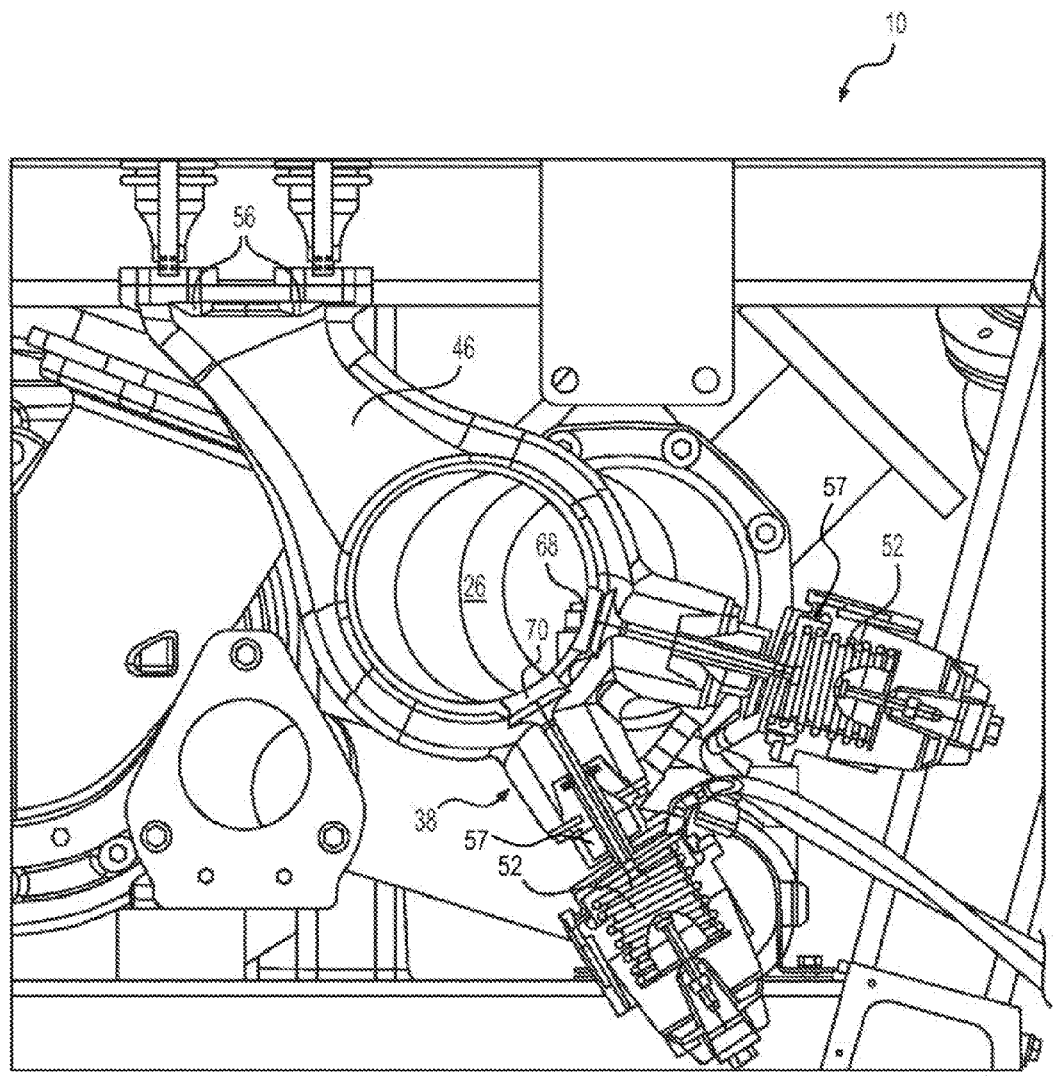
FIG. 4 is an illustration of another exemplary disclosed bypass mechanism that may be used with the exhaust system of FIG. 1.

FIG. 4 depicts a cross-sectional view of bypass mechanism 38 installed on engine 10. The bypass mechanism 38 depicted in FIG. 4 is an alternative embodiment that omits passage 48 and valve 50. In this way, valves 52 and openings 68, 70 serve as the only means by which to control an amount of exhaust gas that enters bypass manifold 46. Exhaust gas may flow into bypass manifold 46 at a rate that depends on the degree to which valves 52 are open and a length of time for which they are open. A controller (e.g., electronic controller) may transmit signals to valves 52 to control the position of a valve component depending on an operating condition of engine 10 (e.g., based on sensor information).

It should be understood that the depicted configurations are exemplary and that other configurations are possible. For example, bypass mechanism 38 may include any number, size, and type of valves and corresponding openings configured to transfer exhaust gas from exhaust passage 26 to bypass manifold 46. In an exemplary embodiment, bypass mechanism 38 may include at least two different types of valves (e.g., butterfly valve 55 and poppet valve 57) configured to allow exhaust gas to enter bypass manifold 46 from exhaust passage 26. In another embodiment, bypass mechanism 38 may include a plurality of the same type of valve 42 configured to provide precise control over an amount of exhaust gas that is let out of exhaust passage 26. In an exemplary embodiment, the valves 42, however configured, are arranged generally symmetrically, such as to approximately evenly divide exhaust gas flow between multiple conditioning members 54. Similarly, the openings, however many, may be positioned on an opposite side of exhaust passage 26 from entry passages 56 to induce flow around the outside of exhaust passage 26.

INDUSTRIAL APPLICABILITY

The disclosed exhaust system and bypass mechanism of the present disclosure may be applicable to any engine application, where turbocharger exhaust bypass is desired in a compact space. The disclosed bypass mechanism provides for the exhaust bypass in a compact configuration by using a bypass manifold that surrounds the exhaust passage. The disclosed bypass mechanism may also be particularly applicable to engines in which it is desired or critical to have precise control over an amount of exhaust that is bypassed. The plurality of openings and valves, as well as the possibility of having different types of valves, allows for greater control over the flow rate of exhaust into the bypass manifold. Further, the bypass mechanism of the present disclosure is applicable to engines in which multiple conditioning members of an aftertreatment component are present. The disclosed bypass mechanism includes a symmetrical configuration that helps to approximately equally divide bypassed exhaust gas into two streams.

In use, exhaust gas may travel from cylinders 14 to turbine(s) 28 through exhaust passage 26. When it is necessary to bypass some of the exhaust gas (e.g., when a controller receives an indication of an operating condition from a sensor) valves 42 may be controlled to allow a selected amount of exhaust gas to travel from exhaust passage 26 into bypass manifold 46. In the embodiment of FIGS. 2-3, first valve 50 may be used to allow a relatively small amount exhaust gas to flow through passage 48 and into bypass manifold 46. However, when a larger amount of exhaust gas is to be bypassed (or the exhaust gas needs to be bypassed quicker), the second valves 52 may be opened to allow exhaust gas to directly enter bypass manifold 46 from exhaust passage 26. The degree to which the valves 50 and 52 are opened may depend on the desired amount and/or flow rate of exhaust gas to be bypassed.

Several advantages may be associated with the disclosed exhaust system and bypass mechanism. For example, because the disclosed bypass mechanism may utilize different types of valves, better flow control over bypassing exhaust may be achieved. Further, the bypass manifold being formed around the exhaust passage provides a compact configuration that does not take up a significant amount of space on the engine.

In addition, the disclosed configuration, in which openings into the bypass manifold and entry passages of the exhaust stack (including any aftertreatment components) are positioned on opposite sides of the exhaust passage, provides several advantages. First, this configuration allows the flow to be bifurcated between two pathways, one below the exhaust passage and one above the exhaust passage. Dividing the flow of exhaust in this way allows the bypassed exhaust to be separated into one stream that primarily flows into the first of the entry passages and one stream that primarily flows into the second of the entry passages. This helps to prevent one of the two conditioning members from being overloaded with exhaust, while the other conditioning member receives much less exhaust. Second, the disclosed configuration allows exhaust gas within the exhaust passage and bypassed exhaust gas to remain in thermal contact for a longer period of time (e.g., as the bypass exhaust gas travels under or over the exhaust passage). This helps to ensure component longevity by preventing thermal gradients throughout the walls of the ducts due to rapid changes in temperature over time, thereby reducing internal stresses and resultant potential for mechanical damage.

It will be apparent to those skilled in the art that various modifications and variations can be made to the exhaust system and bypass mechanism of the present disclosure without departing from the scope of the disclosure. Other embodiments will be apparent to those skilled in the art from consideration of the specification and practice of the exhaust system and bypass mechanism disclosed herein. It is intended that the specification and examples be considered as exemplary only, with a true scope of the disclosure being indicated by the following claims and their equivalents.

What is claimed is:

1. A bypass mechanism for use with a turbocharger, comprising:
    an exhaust passage formed by at least a first wall;
    a bypass manifold formed by at least a second wall surrounding the exhaust passage and including a space between the first wall and the second wall;
    at least two openings in the first wall fluidly connecting the exhaust passage with the space;
    at least one first valve configured to open and close to selectively allow exhaust gas to pass from the exhaust passage to the space through at least one first opening of the at least two openings; and
    at least one second valve configured to open and close to selectively allow exhaust gas to pass from the exhaust passage to the space through at least one second opening of the at least two openings.

2. The bypass mechanism of claim 1, wherein the at least one second valve includes at least two second valves and the at least one second opening includes at least two second openings, wherein each of the at least two second valves is configured to open and close a second opening of the at least one second openings respectively.

3. The bypass mechanism of claim 2, wherein the at least one first opening fluidly connects the exhaust passage to the space through a passage that extends parallel to the exhaust passage.

4. The bypass mechanism of claim 3, wherein the at least one first valve is positioned in the passage that extends parallel to the exhaust passage.

5. The bypass mechanism of claim 4, wherein the passage is fluidly connected to the space by a manifold entrance, and wherein the manifold entrance is positioned between two of the at least two second openings.

6. The bypass mechanism of claim 5, wherein the bypass manifold includes a first pathway for the exhaust gas to pass around an outside of the exhaust passage on a first side of the first wall and a second pathway for the exhaust gas to pass around the outside of the exhaust passage on a second side of the first wall.

7. The bypass mechanism of claim 6, wherein one of the at least two second openings is adjacent to the first pathway and another one of the at least two second openings is adjacent to the second pathway.

8. The bypass mechanism of claim 3, wherein the two second openings directly fluidly connect the exhaust passage with the space.

9. The bypass mechanism of claim 1, wherein the at least one first valve is a butterfly valve and the at least one second valve is a poppet valve.

10. A bypass mechanism for use with a turbocharger, the turbocharger including a turbine with a turbine inlet and a turbine outlet, comprising:
    an exhaust passage formed by at least a first wall;
    a bypass manifold formed by at least a second wall surrounding the exhaust passage at a first location on the exhaust passage and including a space between the first wall and the second wall;
    at least one opening in the first wall fluidly connecting the exhaust passage with the space; and at least one valve configured to open and close a corresponding opening to selectively allow exhaust gas to pass from the exhaust passage to the space through the at least one opening;

wherein the turbine inlet is fluidly connected to the exhaust passage at a second location, the second location downstream of the first location;

wherein the space is fluidly connected to at least one entry passage of an exhaust stack through a bypass passage;

wherein the turbine outlet is fluidly connected to the bypass passage; and the at least one opening and wherein the at least one entry passage are positioned on opposite sides of the exhaust passage.

11. The bypass mechanism of claim 10, wherein the at least one entry passage is fluidly connected to a conditioning member of an aftertreatment component.

12. The bypass mechanism of claim 10, wherein the at least one opening includes a first opening and second opening downstream from the first opening.

13. The bypass mechanism of claim 12, wherein one of the first opening and the second opening fluidly connects the exhaust passage to the space through a passage that extends parallel to the exhaust passage.

14. The bypass mechanism of claim 10, wherein the at least one valve includes a plurality of valves.

15. The bypass mechanism of claim 14, wherein the plurality of valves includes a plurality of poppet valves.

16. The bypass mechanism of claim 14, wherein the plurality of valves includes at least one butterfly valve.

17. The bypass mechanism of claim 10, wherein the bypass manifold includes a first pathway for the exhaust gas to pass around an outside of the exhaust passage on a first side of the first wall and a second pathway for the exhaust gas to pass around the outside of the exhaust passage on a second side of the first wall.

18. The bypass mechanism of claim 17, wherein the at least one opening is fluidly connected to the first pathway and the second pathway.

19. The bypass mechanism of claim 17, wherein the bypass mechanism is configured to divide exhaust gas that enters the space approximately evenly between the first pathway and the second pathway.

20. An exhaust system for an engine, comprising:
an exhaust passage configured to receive exhaust from the engine;
an exhaust stack configured to direct exhaust to the atmosphere;
a turbocharger fluidly connected between the exhaust passage and the exhaust stack;
an aftertreatment component including at least one conditioning member; and
a bypass mechanism configured to selectively direct exhaust gas from the exhaust passage to bypass the turbine and flow into the aftertreatment component, the bypass mechanism including:
a bypass manifold surrounding the exhaust passage;
at least two openings in the exhaust passage fluidly connecting the exhaust passage with the bypass manifold; and
at least two valves each configured to open and close a respective one of the at least two openings to selectively allow exhaust gas to pass from the exhaust passage to the bypass manifold through the respective opening,
wherein the bypass manifold is fluidly connected to at least one entry passage fluidly connected to the at least one conditioning member,
wherein the at least two openings and the at least one entry passage are positioned on opposite sides of the exhaust passage, and
wherein the bypass manifold includes a first pathway for the exhaust gas to pass around an outside of the exhaust passage on a first side of the exhaust passage and a second pathway for the exhaust gas to pass around the outside of the exhaust passage on a second side of the exhaust passage.

* * * * *